R. B. BOOTH.
HOSE COUPLING.
APPLICATION FILED JULY 22, 1918. RENEWED APR. 18, 1919.

1,304,653.

Patented May 27, 1919.
2 SHEETS—SHEET 1.

R. B. BOOTH.
HOSE COUPLING.
APPLICATION FILED JULY 22, 1918. RENEWED APR. 18, 1919.
1,304,653.
Patented May 27, 1919.
2 SHEETS—SHEET 2.
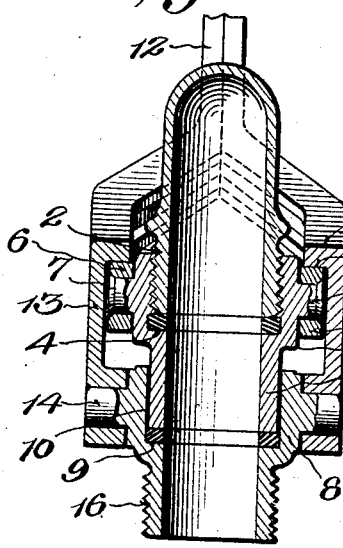
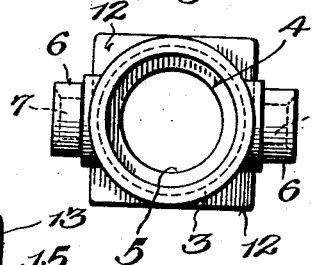
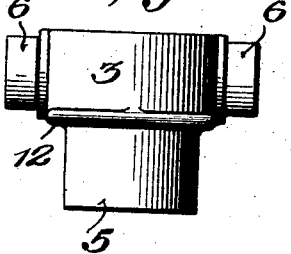
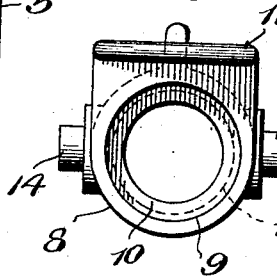
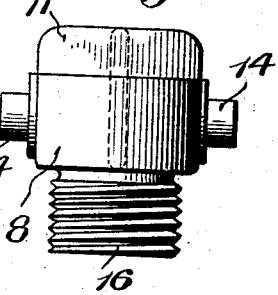
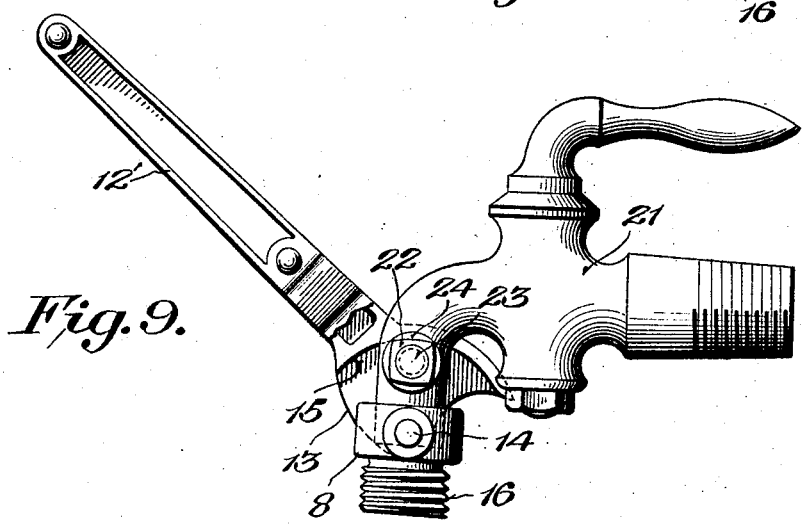
Witness
Chas. L. Griesbauer.
Inventor
Robert B. Booth,
By Pennie, Goldsborough & Thiel
Attorneys

UNITED STATES PATENT OFFICE.

ROBERT BENJAMIN BOOTH, OF HONOLULU, TERRITORY OF HAWAII, ASSIGNOR OF ONE-HALF TO JOHN J. ARMSTRONG, OF HONOLULU, TERRITORY OF HAWAII.

HOSE-COUPLING.

1,304,653.  Specification of Letters Patent.  Patented May 27, 1919.

Application filed July 22, 1918, Serial No. 246,097. Renewed April 18, 1919. Serial No. 291,170.

*To all whom it may concern:*

Be it known that I, ROBERT B. BOOTH, a citizen of the United States, residing at Honolulu, in the county of Oahu, in the Territory of Hawaii, have invented certain new and useful Improvements in Hose-Coupling; and I do hereby declare the following to be a full, clear, and exact description of the invention, such as will enable others skilled in the art to which it appertains to make and use the same.

This invention relates to a hose coupler.

The primary object of the invention resides in the provision of a coupler by means of which a hose may be readily attached to a faucet or the like without necessitating the screwing of the usual hose coupling onto the faucet. Furthermore, the device is designed to attach a hose to a faucet irrespective of whether or not the faucet is supplied with screw threads.

In the drawing:

Fig. 3 is a vertical sectional view on the line 3—3 of Fig. 1 looking in the direction of the arrows;

Fig. 5 is a plan view of the adapter;

Fig. 6 is a side elevation thereof;

Fig. 7 is a plan view of the socket member;

Fig. 8 is a side elevation thereof; and

Fig. 9 is an elevational view showing the device attached to a plain faucet.

Figure 1:
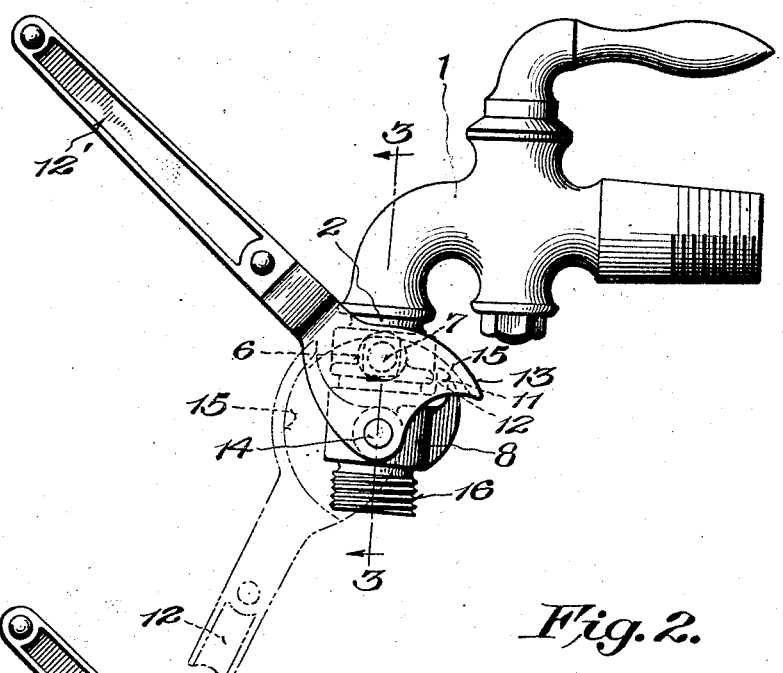
Figure 1 is an elevational view of a faucet of the screw-thread type, showing a device constructed in accordance with my invention, applied thereto, the cam lever being shown in its operative position in full lines and in its inoperative position in construction lines.

In Fig. 1 of the drawing a faucet 1 of the type which is provided with screw threads 2 for the attachment of the hose coupling is illustrated. In this view I have disclosed an adapter 3 which includes a screw-threaded opening 4, arranged to engage the screw threads 2 on the faucet 1. Extending downwardly from this screw-threaded portion is a reduced portion 5 which has a plain outer face, as illustrated clearly in Fig. 6 of the drawing. This adapter is provided at opposite sides with lugs 6 which are rotatably mounted on trunnions 7, which lugs are provided with a plurality of curved faces arranged to engage with the cam surfaces on the lever later to be described. A socket member 8, having an opening 9 therein of sufficient size to receive the projecting neck portion 5 of the adapter is arranged to be engaged with the latter. A gasket 10 is located in this opening 9 of the socket member for the purpose of abutting against the lower edge of the neck 5 and rendering the joint between the adapter and the socket member watertight. This socket member is also provided with an outwardly extending lip 11, which is arranged to engage a complemental portion 12 of the adapter so as to prevent the rotation of the socket member on the adapter during the application of the former to the latter. A lever 12' which is bifurcated at its lower end providing jaws 13, is pivoted at 14 on the socket member 8. Each of these jaws 13 is provided with a cam 15 which is eccentric to the pivot point 14 and the cam surfaces are adapted to ride upon the surfaces of the lugs 6 to draw the socket member tightly into engagement with the neck of the adapter when the lever is moved in one direction, or to release the socket member from the adapter when the lever is moved in the opposite direction.

With this form it will be seen that the adapter is first screwed upon the threads 2 of the faucet and the socket member is then placed upon the neck 5 of the adapter. The lever 12' is then swung about its pivot until the cams 15 engage the lugs 6. The movement of the cams over the lugs will cause a wedging action, due to the eccentricity of the cams, and will tightly draw the socket member 8 into engagement with the adapter. The socket member is provided with a threaded extension 16 which is adapted to receive the usual nipple on the end of the hose. It will thus be seen that after the adapter has been placed on the faucet of the above-referred to type, it will only be necessary to place the socket member 8 on the neck of the adapter and to swing the cam lever 12 into its operative position in order to clamp the hose in place.

Figure 2:
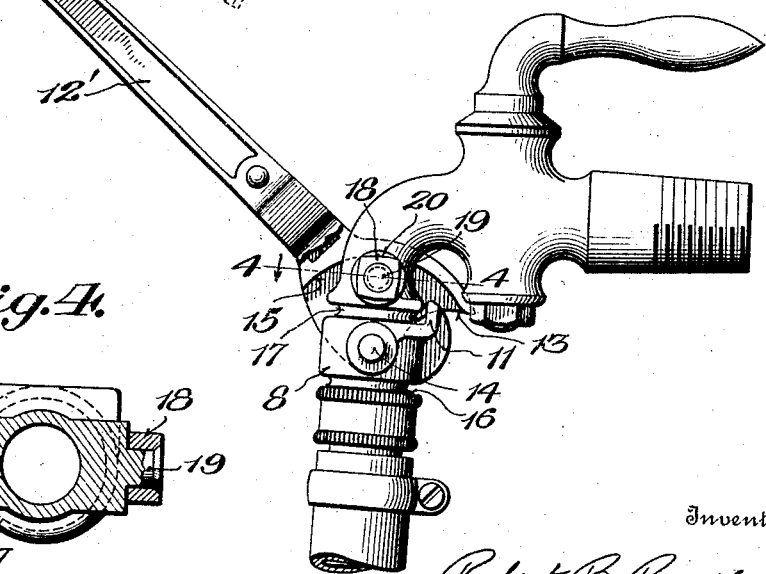
Fig. 2 is a similar view with the adapter omitted and the cam lever engaging directly with the lugs on the faucet.
Figure 4:
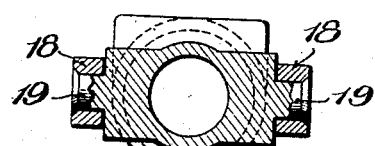
Fig. 4 is a horizontal sectional view on the line 4—4 of Fig. 2, looking in the direction of the arrow.

In Fig. 2 of the drawing a different type of faucet is illustrated. This faucet includes the usual screw threads 17, and instead of providing the adapter which carries the lugs 6, the lugs which are here indicated by the reference character 18, are attached directly to the opposite sides of the faucet. These lugs 18 are similar to the lugs 6, being rotatable on trunnions 19 and having curved surfaces 20. As above indicated, the adapter is omitted in this case, and the socket member 8 which is provided with the lip 11, is placed directly on the screw-threaded end of the faucet. The opening in this socket member is, however, of sufficient diameter to slip on the screw-threaded end of the device without necessitating the screwing of the same into place. The cams 15 of the lever 12' are arranged to coöperate with the lugs 18 in a manner similar to that in which they coöperate with the lugs 6 which are carried by the adapter. It will be seen that in this form the only changes which are made are the omission of the adapter and the placing of the lugs 18 directly on the faucet.

Where it is desirable to use a plain faucet, such as illustrated at 21 in Fig. 9, the lugs 22 are attached directly to the faucet by means of trunnions 23, and these lugs are provided with the curved surfaces 24. The socket member 8 is slipped upon the end of the faucet and the cams 15 ride upon the surfaces 24 of the lugs 22 in the same manner as that described in connection with Fig. 2. The main difference between this figure and Fig. 2 lies in the fact that in Fig. 2 a screw-threaded faucet is illustrated, while in Fig. 9 a plain faucet is illustrated.

It will be noted that, irrespective of whether the lugs 18 are carried directly by the faucet or the adapter, they are fixed with relation to the faucet so that when the cams are forced thereover the socket member will be drawn tightly into engagement with the adapter or with the faucet, as the case may be.

It will be observed from the above that the hose may be first attached to the socket member in such manner as illustrated in Fig. 2 and the socket member may be tightly engaged with the faucet if it be of the type illustrated in Fig. 1, by first screwing the adapter onto the screw-threaded end of the faucet and clamping the socket member to the adapter by the cam lever and lugs. Furthermore, when such faucet as illustrated in Figs. 2 or 9 is used, the hose may be attached to the faucet by clamping the socket member directly on the end of the faucet, the adapter being omitted.

It will be seen, therefore, that the cam lever and socket may be carried directly by the hose and that this being the case the application of the hose to the faucet may be made with the greatest amount of facility and the consumption of minimum time. Furthermore, the coöperation between the cams on the lever and the lugs on the adapter, or on the faucet makes it possible to tightly seal the joints between the several parts, so that no leakage of water will occur.

By making the lugs rotatable on the trunnions on which they are mounted, they will have slight movements during the movement of the cam lever and thus will adapt themselves to the curvature of the cams. Furthermore, the surfaces of the lugs which coöperate with the cams will be constantly changing and, therefore, the wear will be distributed so that the lugs will be useful for a greater length of time than if the same surfaces were presented to the cams continuously.

While I have illustrated and described a particular embodiment of my invention, it is to be observed that various mechanical changes may be made without departing from the spirit of the invention or without exceeding the scope of the claims.

What I claim is:

1. In a hose coupler for faucets, the combination with a socket element having a hose receiving portion, of a lever pivoted thereon and having a cam face, a lug fixed with relation to the faucet and having cam faces which are arranged to selectively engage the cam face on the lever, the lug being rotatable whereby it will adapt itself to the cam face on the lever during the wedging action of the latter.

2. A hose coupler for faucets, comprising a socket element having a hose receiving portion, a cam lever pivoted on said element, and lugs fixed with relation to the faucet, the cam face of said lever being arranged to engage the lugs in various positions to maintain the socket element in place.

3. A hose coupler for faucets, comprising a socket element having a hose receiving portion, a lever pivoted on said element and having a curved cam face, and lugs, fixed with relation to the faucet, with which the said cam face is arranged to engage, the lugs having faces each curved to conform to the curvature of said cam face.

4. A hose coupler for faucets, comprising a socket element having a hose receiving portion, a lever pivoted on said element and having a curved cam face, and lugs, fixed with relation to the faucet, with which the said cam face is arranged to engage, the lugs having faces each curved to conform to the curvature of said cam face and being adapted to rotate.

5. A hose coupler for faucets, comprising a socket element having a hose receiving portion, a lever pivoted to said element and having a cam face, and multi-sided rotatable lugs fixed with relation to the faucet and adapted to be engaged by the cam face.

In testimony whereof I affix my signature.

ROBERT BENJAMIN BOOTH.

Copies of this patent may be obtained for five cents each, by addressing the "Commissioner of Patents, Washington, D. C."